United States Patent Office 3,367,997
Patented Feb. 6, 1968

3,367,997
BLOW MOLDING COMPOSITION COMPRISING A BLEND OF VINYL CHLORIDE HOMOPOLYMERS AND A.B.S. TERPOLYMER
Harold V. Smith, Villa en Genevroz, La Conversion, Vaud, Switzerland
No Drawing. Filed Feb. 20, 1964, Ser. No. 346,086
Claims priority, application Great Britain, Mar. 2, 1963, 8,451/63
8 Claims. (Cl. 260—891)

The present invention relates to a vinyl chloride composition.

It is an object of the invention to provide a composition which, when including a suitable stabiliser, is suitable for the manufacture of bottles and containers by blow moulding.

The invention provides such a composition comprising a mixture of vinyl chloride homopolymers at least one of which homopolymers has a K value (as hereinafter defined) which differs by not less than 10 from the other homopolymer or any or all of the other homopolymers, together with a terpolymer of acrylonitrile, butadiene and styrene which gives a clear mixture with the vinyl chloride homopolymers by fusion. The compatibility of the terpolymer with the vinyl chloride homopolymers can readily be established by experiment.

Preferably, the composition comprises a mixture of vinyl chloride homopolymers at least one of which homopolymers has a K value (as hereinafter defined) which differs by not less than 10 from the other homopolymer or any or all of the other homopolymers, together with a terpolymer of acrylonitrile, butadiene and styrene, in an amount of from 5% to 30% by weight, preferably 6% to 16% by weight, of the total weight of the terpolymer and the mixture of vinyl chloride homopolymers, the terpolymer having a butadiene content of from 20% to 40% by weight, preferably 30% by weight, an acrylonitrile content of from 15% to 35% by weight, preferably 25% by weight, and a styrene content of from 35% to 55% by weight, preferably 45% by weight.

The difference in K valve between two homopolymers in the mixture may, for example, be as great as 35 but usually will not be greater than 20.

Preferably, the mixture of homopolymers is constituted of equal parts by weight of two vinyl chloride homopolymers (suitably having K values of 50 and 65, respectively). However, the mixture may contain more than two vinyl chloride homopolymers, e.g., three homopolymers having K values of 50, 60 and 70, respectively. The ratio of two homopolymers of differing K value may be adjusted to suit the processing conditions required of the compound. Mixtures containing from 70% by weight of the high K value polymer and 30% by weight of the low K value polymer to 30% by weight of the high K value and 70% by weight of the low K value polymers have applications in particular cases. Similarly, where three polymers are involved, the percentage of each present in the mixture would normally lie between 20% and 60% by weight of the total homopolymer mixture.

It is also preferred that the homopolymers are suspension polymers.

To increase resistance to thermal decomposition, particularly in the severe conditions associated with blow moulding machines, it is necessary to include a stabiliser in the composition. For most purposes, it is desirable that the stabiliser employed should be non-toxic, should not adversely affect the clarity of the article produced by the blow moulding and should have no offensive odour. It has been found that a satisfactory stabiliser is a di-n-octyl tin compound, suitably a maleate, for example di-n-octyl tin polypropylene glycol maleate. Another stabiliser which has been found effective is bis(dioctyltin monooctyl maleate) maleate. Calcium-zinc epoxy stabilisers of the type disclosed in my British Patent No. 997,187 (now British Patent No. 997,187), viz., a stabilizer consisting essentially of 25–75 wt. percent of at least one organometal compound selected from soaps, phenolates and organic acid salts (other than soaps) of at least one of the metals Li, Na, K, Mg, Ca, Sr, Ba, Zn, Cd, Zr, Sn, Pb and Mn; 5 to 25 wt. percent of at least one organic nitrogenous compound selected from the group consisting of one mono- and disubstituted amides, substituted imines, esters of amino acids and mixtures thereof and 5 to 25 wt. percent of a high-molecular weight epichlorhydrin-diphenylolpropane condensate, and octyltin stabilisers of the type defined in my co-pending U.S. patent application Ser. No. 280,154, filed May 13, 1963, (now abandoned, said application corresponding to British Patent 1,006,845), viz., at least one of each of the compounds of the following general formulae

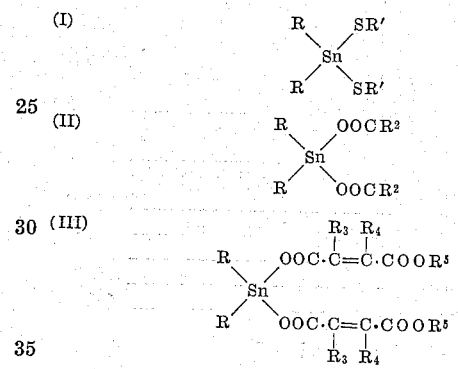

in admixture in the form obtainable by reacting, in amounts which theoretically would give rise to a mixture of from 40% to 70%, preferably 60%, by weight of a compound or compounds of the general Formula I, from 15% to 30%, preferably 20%, by weight of a compound or compounds of the general Formula II and from 15% to 30%, preferably 20%, by weight of at least one compound of the general Formula III, at least one diorgano tin oxide, halide or alkoxide with:

(A) at least one mercaptan, mercaptide, mercapto alcohol, mercapto ether, ester of a mercapto alcohol, ester of a mercapto acid and at least one thiolic acid;

(B) at least one monocarboxylic acid, and (C) at least one monoester of an unsaturated dicarboxylic acid; wherein R is selected from the group consisting of aromatic and alicyclic groups, including particularly a member of the hydrocarbon group consisting of methyl, ethyl, n-propyl, iso-propyl, n-butyl, iso-butyl, amyl, n-octyl, iso-octyl, 2-ethyl hexyl, lauryl, allyl, benzyl, phenyl, tolyl, and cyclohexyl $SR^1$ is the residue of a mercaptan mercaptide, mercapto alcohol, mercapto ether, an ester of a mercapto alcohol or mercapto acid, or the residue of a thiolic acid; $R^2$ is a monovalent alkyl group of from 6 to 20 carbon atoms; and groups $R^3$ and $R^4$ is an alkylene group, and $R^5$ is a member of the group consisting of alkyl, aryl and alicyclic groups; are also valuable in the present composition. Such stabilisers are normally employed in the ratio by weight of 1 to 2.5 parts per 100 parts of P.V.C. polymer.

Further, to ensure a rapid passage of the composition through a blow moulding machine and an easy release of the container from the mould, a lubricant should be employed as a constituent of the composition and it has been found that a mixture of glyceryl monostearate and behenic acid and/or stearic acid is satisfactory for this purpose. Such lubricants are normally employed in a ratio by weight of 0.25 to 1.5 parts per 100 parts of P.V.C. polymer. An agent to correct the natural yellow tinge of P.V.C. resins may also be added, such as Calco oil violet, or acid-resisting ultramarine.

If desired, a plasticiser may be included in the composition. Such plasticiser would normally have to be non-toxic and non-extractable and to be employed in very small quantities. Two parts by weight of epoxidised soya-bean oil per 100 parts by weight of P.V.C. polymer has been found effective.

The K value mentioned hereinabove is as determined by DIN.53726 (the Fikentscher method using cyclohexanone as the solvent), and is a measure of the molecular weight of a polymer.

The composition of the present invention makes it possible to produce by blow moulding containers, for example bottles, having a high impact strength, for example, some 300% to 500% greater than can be obtained by using any vinyl chloride polymer or polymers alone, crystal clarity, non-toxicity, low permeability to the transmission of odour and flavour, rigidity and reasonably low raw material cost.

The following are examples of compositions in accordance with the present invention ready for use in a blow moulding machine:

| Example 1 | Parts by weight |
|---|---|
| Vipla K.L.V. (a suspension homopolymer of vinyl chloride with a K value of 70) | 50 |
| Vipla K.R. (a suspension homopolymer of vinyl chloride with a K value of 50) | 50 |
| Blendex 401 (an acrylonitrile-butadiene-styrene copolymer) | 18 |
| Di-n-octyltin polypropylene glycol maleate | 2.5 |
| Glyceryl monostearate | 1 |
| Behenic acid | 0.3 |
| Calco oil violet | 0.0001 |

*Examples 2 to 5*

| | 2 | 3 | 4 | 5 |
|---|---|---|---|---|
| Solvic 229 (A vinyl chloride suspension polymer of a K value of 60) | 50 | | | |
| Vipla K.R. | 50 | 50 | 50 | 50 |
| Vipla K.L.V. | | 50 | | 50 |
| Corvic D65/1 (A vinyl chloride suspension polymer of a K value of 65) | | | 50 | |
| Blendex 401 | 18 | 18 | 18 | 18 |
| Bis(di-n-octyltin monooctyl maleate) | 2 | 2 | 2 | |
| Di-n-octyltin bis (monooctyl maleate) | | | | 2 |
| Glyceryl monostearate | 1 | 1 | 1 | 1 |
| Behenic acid | 0.3 | 0.15 | | |
| Stearic acid | | 0.15 | 0.3 | 0.3 |
| Epoxy soyabean oil (plasticiser) | | 2 | | 2 |

*Examples 6 to 8*

| | 6 | 7 | 8 |
|---|---|---|---|
| Vipla K.L.V. | 25 | 50 | 40 |
| Solvic 229 | 25 | | |
| Vipla K.R. | 20 | 50 | 60 |
| Blendex 401 | 6 | 9 | 12 |
| Glyceryl monostearate | 1.00 | 1.25 | 1.50 |
| Behenic acid | 0.25 | 0.25 | 0.25 |
| Di-n-octyltin bis (mono octylmaleate) | 1.5 | | |
| Bis(di-n-octyltin mono octylmaleate) | | | 1.5 |
| Epoxy soya-bean oil | 2.0 | 2.0 | |
| Calcium-zinc stabiliser as defined in co-pending British patent application No. 18,146/62 | | 2.5 | |
| Acid-resisting ultramarine blue | | | 0.01 |

In practice, the various ingredients of the above mixtures are charged into a high-speed centrifugal blender or turbo-mixer containing a rotor rotating in a horizontal plane at not less than 1500 r.p.m. The frictional energy provided by the rotor heats up the mixture until it reaches a temperature which must be controlled between 105 and 125° C. When the chosen temperature is reached, the material is discharged into a cooled mixer and slowly stirred until the temperature is below 60° C. The resulting powder can either be compounded by any of the conventional methods known to those skilled in the art, or it can be charged directly to a blow-moulding machine. Preferably, the blow-moulding machine should be in accordance with my co-pending British patent application No. 4,969/63.

Bottles produced by blow moulding the compositions set out in the above examples all possessed rigidity, a high impact strength, crystal clarity, non-toxicity and low permeability to the transmission of odour and flavour, as hereinbefore mentioned.

I claim:

1. A blow moulding composition comprising a mixture of vinyl chloride homopolymers at least one of which has a minimum K value of approximately 50, which value is lower by not less than 10 than the K value of at least one other of said homopolymers in said mixture, said mixture of homopolymers containing at least 20% by weight of each homopolymer, and a terpolymer of acrylonitrile, butadiene and styrene, which terpolymer is present in an amount of from 5% to 30% by weight of the total weight of said terpolymer and said mixture of vinyl chloride homopolymers, and which has an acrylonitrile content of from 15% to 35% by weight of said terpolymer, a butadiene content of from 20% to 40% by weight of said terpolymer, and a styrene content of from 35% to 55% by weight of said terpolymer.

2. A blow moulding composition according to claim 1 including from 1 to 2.5 parts per 100 parts by weight of said mixture of vinyl chloride homopolymers of a stabiliser selected from the group consisting of di-n-octyl tin polypropylene glycol maleate, bis(di-n-octyl tin mono octyl maleate) maleate. A composition consisting of a mixture of dialkyl tin mercapto acid, a fatty acid and a monoalkyl maleic acid ester; a composition consisting of a mixture of calcium soap, an amino compound and an epoxy condensate, and a composition consisting of a mixture of a zinc soap, an amino compound and an epoxy condensate.

3. A blow moulding composition as claimed in claim 1, in which said mixture of homopolymers consists of 30% to 70% by weight, based on the homopolymer content, of one homopolymer, the balance being of the other homopolymer.

4. A blow moulding composition as claimed in claim 1, in which said mixture of three homopolymers consists of from 20% to 60% by weight based on the homopolymer content, of one homopolymer, the balance being of the other two homopolymers.

5. A blow moulding composition as claimed in claim 1, in which said terpolymer of acrylonitrile, butadiene and styrene is present in an amount of from 6% to 16% by weight of the total weight of the terpolymer and the mixture of vinyl chloride homopolymers.

6. A blow moulding composition as claimed in claim 1, in which said terpolymer has an acrylonitrile content of 25% by weight, a butadiene content of 30% by weight and a styrene content of 45% by weight.

7. A blow moulding composition as claimed in claim 1, which includes from 0.25 to 1.5 parts per 100 parts by weight of said mixture of vinyl chloride homopolymers, of a lubricant.

8. A blow moulding composition as claimed in claim 1, which includes 2 parts per 100 parts by weight of said mixture of vinyl chloride homopolymers, of a lubricant.

(References on following page)

References Cited

UNITED STATES PATENTS

| | | | |
|---|---|---|---|
| 2,753,322 | 7/1956 | Parks et al. | 260—891 |
| 3,021,302 | 2/1962 | Frey et al. | 260—891 |
| 2,921,917 | 1/1960 | Longman | 260—23 |
| 3,167,527 | 1/1965 | Hechenbleikner et al. | 260—45.75 X |
| 3,287,447 | 11/1966 | Faure | 260—899 |

OTHER REFERENCES

Kaufman, M.: "Advances in P.V.C. Compounding and Processing." London, Maclaren and Sons, 1962, pp. 3, 4, 87, and 88.

MURRAY TILLMAN, *Primary Examiner.*

M. J. TULLY, *Assistant Examiner.*